Figure 1:
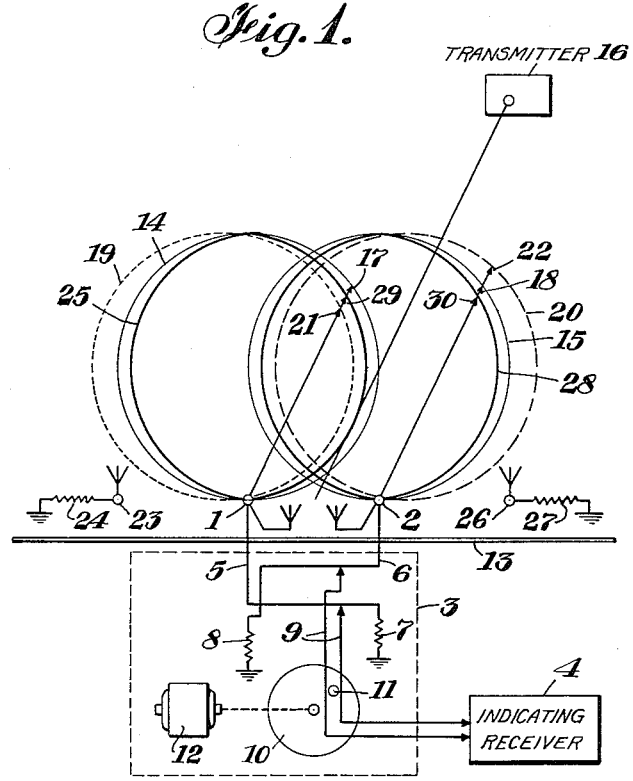

July 12, 1955  R. F. BAUM  2,713,164

DIRECTION FINDING SYSTEM

Filed May 21, 1945

INVENTOR.
RICHARD F. BAUM

BY

R. P. Morris
ATTORNEY

United States Patent Office 2,713,164
Patented July 12, 1955

2,713,164

DIRECTION FINDING SYSTEM

Richard F. Baum, New York, N. Y., assignor to International Telephone and Telegraph Corporation, a corporation of Maryland Application May 21, 1945, Serial No. 594,860

11 Claims. (Cl. 343—113)

This invention relates to direction finding systems and more particularly to direction finding systems wherein energy collected in two separate radiant acting means is combined in phase opposition to provide a null direction finding indication.

Direction finder systems have been proposed wherein two spaced radiators, such as for example antennas, are interconnected by transposed lines such that normal phase opposition of radiant action at right angles to the line of the antennas will produce a null at the midpoint of the interconnecting transmission line. A so-called phase shift type of goniometer is used therewith, this consisting of a transmission line coupled to the interconnecting line between the antennas and adjustable therealong to provide phase opposition of the energy from the two antennas at a point dependent upon the direction from which energy is received. This output energy is then applied to an indicating receiver so that a direction line corresponding to the null may be indicated. Such a direction finding indicator is shown, for example, in the copending application of Nathan Marchand, Serial No. 553,562, filed September 11, 1944.

It has been found that with this type of direction finder the null position of the phase shift goniometer does not always present a true directional indication since the antennas react upon one another and cause unsymmetrical distortion of the two directive patterns.

In accordance with my invention, I provide auxiliary radiant acting means such as for example auxiliary radiators not connected to the phase shift goniometer and receiver apparatus. These auxiliary radiant acting means may be simply terminated in impedances substantially equal to the impedance of the apparatus to which the principal antennas are coupled. These auxiliary means are preferably each spaced from the adjacent antennas substantially the same distance as the spacing between the principal antennas. As a consequence, each associated antenna and auxiliary radiator presents a more nearly uniform symmetrical pattern. The auxiliary radiator means is generally spaced from the antenna to which it is not closely associated twice the distance to its associated antenna and therefore exerts very minute influence on the symmetry of the pattern of this antenna. Thus, by providing these auxiliary radiators, the directive patterns of the principal antennas are substantially restored to symmetry.

It is an object of my invention to provide auxiliary re-radiating means so associated with a pair of directive radiators to compensate for the distortion of field patterns of each of said radiators caused by the mutual interaction thereof.

It is a further object of my invention to provide in a direction finder wherein energy received on two separate radiators is compared to provide a null indication, spaced auxiliary radiator means to compensate for the distortion caused by the mutual interaction of the direction finder antenna means.

It is a still further object of my invention to provide in a phase shift direction finding indicator of the type wherein two directive antennas are coupled together in energy transposed relation and through a phase shift goniometer to an indicating receiver, a system for substantially compensating the inherent amplitude differences in energy received by the two directive antennas to correct the direction finding indication of the system.

Figure 2:
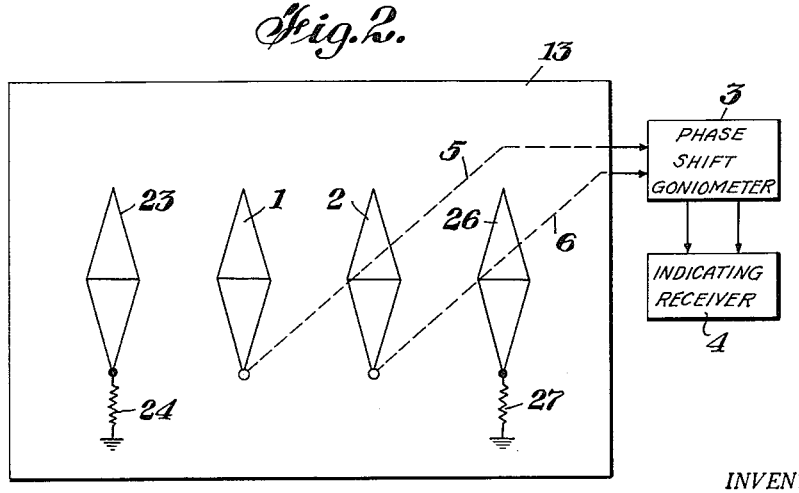

A better understanding of my invention and the objects and features thereof may be had from the particular description of an embodiment thereof made with reference to the accompanying drawing, in which:

Fig. 1 is a plan view in block diagram illustrating a direction finder in accordance with my invention; and Fig. 2 is an elevational view of the direction finder system illustrated in Fig. 1.

In Figs. 1 and 2, is shown a direction finder comprising a pair of radiators 1, 2 coupled through a phase shift goniometer 3 to a direction indicating receiver 4. Phase shift goniometer 3 comprises lines 5 and 6 each terminated in characteristic impedances 7 and 8 respectively, and cross connected as shown. At adjustable points along lines 5 and 6 is coupled the phase shift goniometer connection 9 which may be moved backwards and forwards over these lines by means of a rotatable disc 10 having a crank pin 11 and driven by some suitable driving means such as motor 12.

Antennas 1 and 2 are arranged in front of a reflecting screen 13 and preferably so shaped that their patterns are substantially circular as indicated by the light solid lines 14 and 15 respectively. It will thus be seen that if this true circular relationship could be maintained, energy from an angularly positioned transmitter 16 would be received with substantially equal amplitude at antennas 1 and 2 as indicated by the arrowheads 17 and 18. Thus, these energies being of equal amplitude would differ only in phase as applied to antennas 1 and 2. Therefore, when connection 9 was adjusted to provide a 180° phase opposition, the energy applied would be of equal amplitude from the two antennas and a null or zero energy would be applied to indicating receiver 4.

However, antenna 2 exerts a reradiation influence on antenna 1 causing the radiation pattern to be distorted, for example as shown at 19 by the light dash line. Similarly, the parasitic or reradiation action of antenna 1 causes the pattern from antenna 2 to be distorted into an unsymmetrical position as shown at 20. As a consequence, the measure of energy applied to antenna 1 will be relatively decreased as indicated at arrowhead 21, while that applied to antena 2 will be relatively increased as indicated by the arrowhead 22. This will result in an obscure null indication in phase shift goniometer 3 and a substantial displacement of the null from the true direction indicating position.

If now, an auxiliary antenna or radiator 23 is spaced from antenna 1 on the side opposite of antenna 2 a distance substantially equal to the spacing between antennas 1 and 2 and if this auxiliary radiator is terminated in an impedance 24 substantially equal to the impedance presented to antennas 1 and 2 in the phase shift goniometer circuit 3, then there will be a substantially symmetrical antenna array so far as the effect of mutual coupling among antennas 1, 2 and auxiliary radiator 23 is concerned. As a result, the pattern will become again symmetrical with respect to antenna 1 although slightly differently shaped as indicated at 25. If a second auxiliary antenna or radiator 26 terminated in an impedance 27 is also arranged on the opposite side of antenna 2 from the position of antenna 1 this will serve substantially to compensate for the asymmetrical distortion of the pattern of antenna 2 producing a substantially symmetrical pattern shown at 28. When the entire array is now considered, it is clear that auxiliary radiators 23 and 26 would tend to again produce asymmetry in the two patterns. However, in practice, the spacing between auxiliary antenna 23 and radiator 2 and similarly the spacing between auxiliary antenna 26 and antenna 1 is sufficiently great so that the mutual coupling effects of these antennas are relatively negligible. As a consequence, the transmitting source 16 will again present substantially equal energy to antennas 1 and 2 as indicated by arrowheads 29 and 30. It will thus be seen that these auxiliary radiators added to the system substantially compensate for the asymmetrical distortion caused by the mutual coupling of the two antennas so that the direction finding null produced thereby will present a substantially true direction indication.

In Fig. 2, radiators 1, 2, and auxiliary radiators 23 and 26 are shown as being of a double conical form to present a better impedance match over a relatively broad frequency range for the direction finding operation. It should be clear, however, that the type of antenna used is immaterial to the operation of the system in accordance with my invention.

For best operating results, all of the antennas 1, 2, and auxiliary radiators 23 and 26 should have similar radiation characteristics and should be coupled to loads of substantially equal values. However, in test equipment wherein the principal radiators were formed substantially in the shape of double base cones as shown at 1 and 2, auxiliary radiators such as 23 and 26 were used in the form of simple straight rods. In this test set up it was found that the direction error introduced by the distortion was cut down by a substantially 2:1 ratio.

It will be clear that any type of antennas may be used for this purpose but in the phase shift direction finder arrangement it is preferable that the antennas be so constructed as to produce with the reflector a substantially circular radiation pattern so that energy may be received at substantial levels in all directions to be searched. It will further be clear, however, that in any system where the amplitude of energy as received on two spaced radiators is important and symmetry of the patterns from the two antennas is also of importance, the principles of my invention as described above may be readily applied to compensate for the distortion caused by mutual interaction. Furthermore, if with only two auxiliary antennas too great a distortion is found to exist, further spaced auxiliary antennas may be provided in the array to increase the symmetry of the radiated patterns.

While I have described above the principles of my invention particularly as applied to a form of direction finding circuits, it should be clearly understood that this is given merely by way of example and may as well apply to transmission circuits where shifting of the null becomes important. The particular illustrative examples are not to be considered as a limitation of my invention as set forth in the objects thereof and in the accompanying claims.

I claim:

1. In a directional radiant acting system, similar first and second directive radiant acting means spaced from one another a predetermined distance, and so mounted that the mutual reaction effects of said radiant acting means tend to distort their respective radiation patterns from symmetry, and parastic reradiating means mounted on opposite sides of said first and second radiant acting means each mounted in principle coupling relation with its associated radiant acting means in such relationship that reradiation from said auxiliary radiators will substantially compensate the distortion.

2. In a directional radiant acting system, similar first and second directive radiant acting means spaced from one another a predetermined distance, and so mounted that the mutual reaction effects of said radiant acting means tend to distort their respective radiation patterns from symmetry, and parasitic reradiating means mounted on opposite sides of said first and second radiant acting means each mounted in principle coupling relation with its associated radiant acting means at substantially said predetermined distance from the adjacent directive radiant acting means, whereby the parasitic reradiation from said auxiliary radiators will substantially compensate the distortion.

3. In a directional radiant acting system, similar first and second directive radiant acting means spaced from one another a predetermined distance, whereby the mutual reaction effects of said radiant acting means tend to distort their respective radiation patterns from symmetry, auxiliary radiant acting means mounted in line with said first and second radiant acting means on opposite sides thereof in such relationship that the parasitic reradiation from said auxiliary radiators will substantially compensate the distortion, and dissipating load means coupled to each said auxiliary radiant acting means.

4. In a directional radiant acting system, similar first and second directive radiant acting means spaced from one another a predetermined distance, whereby the mutual reaction effects of said radiant acting means tend to distort their respective radiation patterns from symmetry, a translating means coupled to said radiant acting means, auxiliary radiant acting means mounted in line with said first and second radiant acting means on opposite sides thereof at substantially said predetermined distance from the adjacent directive radiant acting means, whereby the parasitic reradiation from said auxiliary radiators will substantially compensate the distortion, and dissipating load means coupled to each said auxiliary radiant acting means.

5. In a direction finder wherein the energy from two spaced antennas is compared in phase opposition to determine a null indicating the direction line toward a radiant energy source, means for compensating the pattern distortion of said antennas caused by the parasitic action of each antenna on the other, comprising auxiliary radiators substantially in line with said antennas mounted on opposite sides thereof, and means for terminating said auxiliary radiators into an impedance substantially the same as the load of said antennas.

6. A direction finder comprising a pair of antennas spaced apart a predetermined distance, conductor means for interconnecting said antennas in normal phase opposition, adjustable means coupled to said conductor means for adjustment to a null energy deriving position along said conductor means, and parasitic reradiating means mounted in electrical coupling with and on opposite sides of said antennas and substantially in line therewith to compensate for the distortion from symmetry of said antennas caused by their mutual reaction.

7. In a direction finder wherein the energy from two spaced antennas is compared in phase opposition to determine a null indicating the direction line toward a radiant energy source, means for compensating the pattern distortion of said antennas caused by the mutual reaction of each antenna on the other, comprising auxiliary radiators in line with said antennas mounted on opposite sides thereof at a spacing from the adjacent antenna substantially equal to the spacing between said antennas, and means for terminating said auxiliary radiators into an impedance substantially the same as the load of said antennas.

8. A direction finder comprising a pair of antennas spaced apart a predetermined distance, conductor means for interconnecting said antennas in normal phase opposition, adjustable means coupled to said conductor means for adjustment to a null energy deriving position, and parasitic reradiating means mounted in electrical coupling with and on opposite sides of said antennas and substantially in line therewith, said reradiating means spaced from the antennas respectively adjacent thereto a distance substantially equal to said predetermined distance.

9. A direction finder comprising a pair of antennas spaced apart a predetermined distance, conductor means for interconnecting said antennas in normal phase opposition, adjustable means coupled to said conductor means for adjustment to a null energy deriving position, auxiliary radiator means on opposite sides of said antennas and substantially in line therewith, spaced from the antennas respectively adjacent thereto a distance substantially equal to said predetermined distance, and dissipative load means coupled to said auxiliary radiator means.

10. In a directional radiant acting system, similar first and second directive radiant acting means spaced from one another a predetermined distance, whereby the mutual reaction effects of said radiant acting means tend to distort their respective radiation patterns from symmetry, auxiliary radiant acting means mounted on opposite sides of said first and second radiant acting means in such relationship that reradiation from said auxiliary radiators will substantially compensate the distortion, and a reflector means located behind said radiant acting means to render their radiant action unidirectional.

11. A direction finder comprising a pair of unidirectional antennas spaced apart a predetermined distance, conductor means for interconnecting said antennas in normal phase opposition, adjustable means coupled to said conductor means for adjustment to a null energy deriving position, auxiliary unidirectional radiator means on opposite sides of said antennas and substantially in line therewith, spaced from the antennas respectively adjacent thereto a distance substantially equal to said predetermined distance, and dissipative load means coupled to said auxiliary radiator means.

References Cited in the file of this patent

UNITED STATES PATENTS

| | | |
|---|---|---|
| 1,471,165 | Jones | Oct. 16, 1923 |
| 2,153,292 | Berndt | Apr. 4, 1939 |
| 2,153,975 | Smith et al. | Apr. 11, 1939 |
| 2,189,283 | Franz | Feb. 6, 1940 |
| 2,226,379 | Kummich et al. | Dec. 24, 1940 |
| 2,327,435 | Kandoian | Aug. 24, 1943 |
| 2,406,734 | Alford | Sept. 3, 1946 |

FOREIGN PATENTS

| | | |
|---|---|---|
| 682,025 | Germany | Oct. 6, 1939 |